United States Patent [19]

Uramachi

[11] Patent Number: 5,361,634
[45] Date of Patent: Nov. 8, 1994

[54] HEAT-SENSITIVE FLOW RATE SENSOR
[75] Inventor: Hiroyuki Uramachi, Himeji, Japan
[73] Assignee: Mitsubishi Denki Kabushiki Kaisha, Tokyo, Japan
[21] Appl. No.: 111,871
[22] Filed: Aug. 26, 1993
[30] Foreign Application Priority Data Aug. 28, 1992 [JP] Japan .................. 4-229895

[51] Int. Cl.⁵ .................................. G01F 1/68
[52] U.S. Cl. ......................... 73/204.26; 73/204.18
[58] Field of Search ........... 73/204.18, 204.19, 204.25, 73/204.26, 204.27, 118.2

[56] References Cited

U.S. PATENT DOCUMENTS

| 4,554,829 | 11/1985 | Sumal | 73/204.26 X |
| 4,783,996 | 11/1988 | Ohta et al. | 73/204.26 X |
| 4,803,875 | 2/1989 | Kuhn et al. | 73/204.26 |
| 5,094,105 | 3/1992 | Emmert, Jr. et al. | 73/204.25 |

FOREIGN PATENT DOCUMENTS 108930  7/1986  Japan .

Primary Examiner—Herbert Goldstein
Attorney, Agent, or Firm—Sughrue, Mion, Zinn, Macpeak & Seas

[57] ABSTRACT

A heat-sensitive flow rate sensor employs a measuring resistor unit which has a heat-sensitive resistor. The resistance value of the heat-sensitive resistor progressively decreases towards a supporting portion by which the measuring resistor unit is supported in a detecting tube. Start-up time until the required operation temperature is reached after turning on of the power is shortened and high measuring accuracy is obtained.

4 Claims, 7 Drawing Sheets

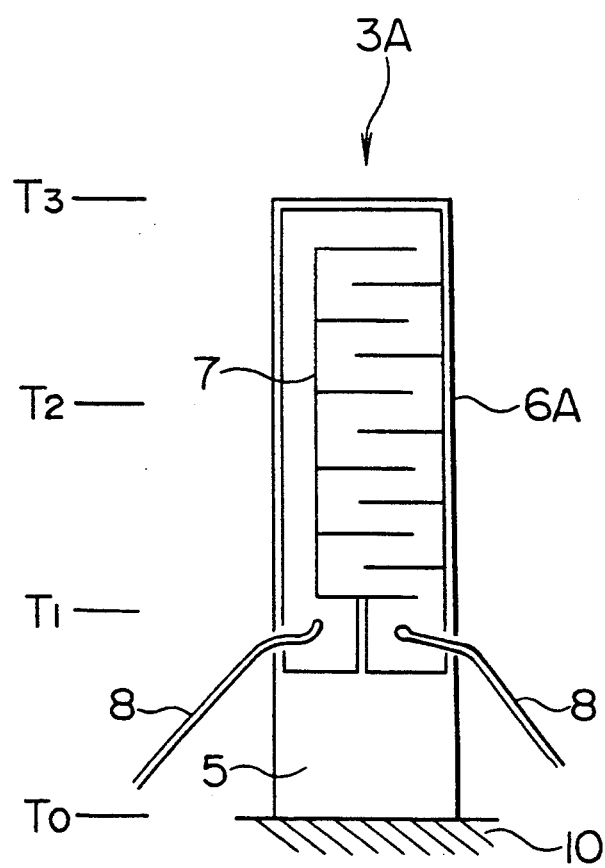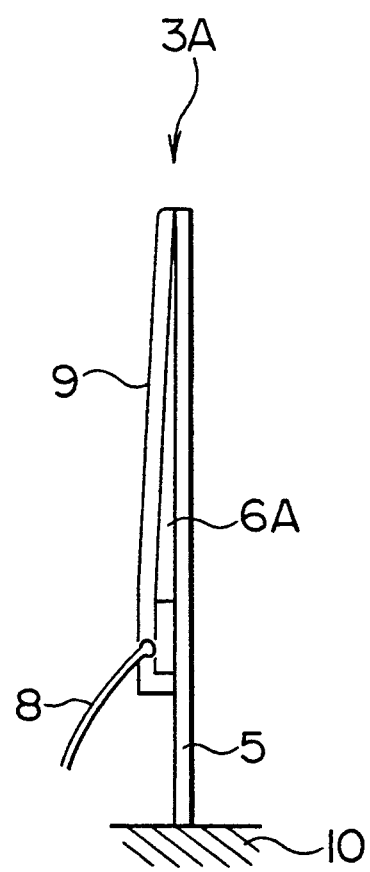

HEAT-SENSITIVE FLOW RATE SENSOR

BACKGROUND OF THE INVENTION

1. Field of the Invention

The present invention relates to a heat-sensitive flow rate sensor for use in measuring flow rate and flow velocity of a fluid and, more particularly, to a heat-sensitive flow rate sensor of the type which measures flow velocity and flow rate of a fluid based on the rate at which heat is carried away from a probe by the fluid which flows in contact with the probe.

2. Description of the Related Art

FIG. 5 schematically shows the construction of a known heat-sensitive flow rate sensor of the type which is disclosed in Japanese Utility Model Laid-Open No. 61-108930. A sensor tube 2, which forms a part of the fluid passage, is provided at a predetermined position in a housing 1 which defines a principal passage for the fluid. A measurement resistor unit 3 including a heat-sensitive resistor 6 (see FIGS. 6A, 6B), as well as a fluid temperature sensor 4, is disposed at predetermined location in the sensor tube 2. The measuring resistor unit 3 and the fluid temperature sensor 4, together with resistors R1 and R2, form a bridge circuit. The junctions b and c of the bridge circuit are connected to a differential amplifier 101. The output of the differential amplifier 101 is connected to the base of a transistor 102. The transistor 102 is connected at its emitter to a junction a of the bridge circuit and at its collector to a power supply 103.

FIGS. 6A and 6B are a front elevational view and a side elevational sectional view of an example of the measuring resistor unit 3 of the heat-sensitive flow rate sensor. Referring to these Figures, the measuring resistor unit 3 has a substrate 5 made of an insulating material such as alumina on which is formed a heat-sensitive resistor 6 in the form of a film. The heat-sensitive resistor 6 is made of a material which varies its resistivity according to temperature, and more specifically, a material having a positive temperature coefficient. Trimming line wirings 7 are laid on the heat-sensitive resistor 6 so as to provide paths of electrical currents. Lead lines 8 are connected to an end of the resistor 6. A protective coat 9 is formed on the heat-sensitive resistor 6 so as to protect the latter. The measuring resistor unit 3 is supported in the detecting tube 2 by a support portion 10.

The operation of this known heat-sensitive flow rate sensor is as follows. When flow of a fluid at a constant flow rate exists in the housing 1, the bridge circuit is balanced in such a manner that the mean temperature of the heat-sensitive resistor 6 of the measuring resistor unit 3 is maintained at a level which is higher than the fluid temperature by a predetermined value, by the control of the electrical current supply to the bridge circuit. The control of the electrical current supply is performed by a control circuit constituted by the differential amplifier 101 and the transistor 102. When the flow rate of the fluid is changed, rates of heat conduction to the surfaces of the heat-sensitive resistor 6 and the supporting substrate 5 are changed. This change varies the temperature of the measuring resistor unit 3, causing a corresponding change in the resistivity of the measuring resistor unit 3, so that an imbalance is caused in the bridge circuit. The control circuit then operates to increase the electrical current supplied to the bridge circuit. Consequently, the heat-sensitive resistor 6 is heated so that the mean temperature of the resistor 6 is elevated to the level exhibited before the change in the fluid flow rate, whereby the bridge circuit is balanced again. The level of the electrical current supplied to the measuring resistor unit 3 is used to measure the flow rate of the fluid. The fluid temperature sensor 4, which is held by another supporting substrate and which is made of a resistor having temperature-dependency of resistivity, provides compensation for change in the output which otherwise is caused by a change in the fluid temperature.

In the known heat-sensitive flow rate sensor having the described construction, not only the heat transferred to the fluid to be measured but also the heat conducted from the supporting substrate 5 to the supporting portion 10 of the measuring resistor unit 3 is sensed. The supporting substrate 5 and the supporting portion 10 which supports the measuring resistor unit 3 have large heat capacities as compared with the heat-sensitive resistor 6. Such undesirable movement of heat inconveniently prolongs the time until the expected operating temperature is reached in the heat-sensitive flow rate sensor, while retarding response of the flow rate sensor to change in the flow rate of the fluid. Consequently, matching or re-establishment of the steady temperature distribution is completed only after elapse of a longtime.

This is attributable to facts that large temperature gradients are formed in the thermal transition regions between the heated portion and non-heated portion of the supporting substrate 5 of the heat-sensitive resistor 6 and between the supporting substrate 5 and the supporting portion 10 of the measuring resistor unit 3. Consequently, the level of the electrical energy supplied to the heat-sensitive resistor 6 does not accurately indicate the flow rate of the fluid, in the transient period before the required operating temperature is reached by the heat-sensitive flow rate sensor. Thus, the known heat-sensitive flow rate sensor involves a risk of inaccurate measurement of the flow rate.

SUMMARY OF THE INVENTION

Accordingly, an object of the present invention is to provide a heat-sensitive flow rate sensor in which temperature gradients are reduced in the heat conduction from the heat-sensitive resistor to the supporting substrate and from the supporting substrate to the supporting portion of the measuring resistor unit, so as to ensure high measuring accuracy and good response characteristic, thereby overcoming the above-described problems of the prior art.

To this end, according to the present invention, there is provided a heat-sensitive flow rate sensor, comprising: a housing which provides a principal path of flow of a fluid; a detecting tube disposed at a predetermined location inside the housing; a measuring resistor unit disposed in the detecting tube; a fluid temperature sensor disposed in the detecting tube; and resistors connected to the measuring resistor unit and the fluid temperature sensor so as to form a bridge circuit; wherein the measuring resistor unit includes a supporting substrate, a heat-sensitive resistor formed on the supporting substrate and wirings formed on the heat-sensitive resistor, the resistance value of the heat-sensitive resistor being so determined as to progressively and continuously decrease towards a supporting portion which supports the measuring resistor unit in the detecting tube.

According to the invention, the resistance value is lowered from the end of the heat-sensitive resistor towards the supporting portion of the measuring resistor unit, so that the portion of the heat-sensitive resistor which locally exhibits the highest temperature is shifted towards the end of the heat-sensitive resistor, whereby temperature gradients are reduced in the heat conduction from the heat-sensitive resistor to the supporting substrate and from the supporting substrate to the supporting portion of the measuring resistor unit.

BRIEF DESCRIPTION OF THE DRAWINGS

FIGS. 1A and 1B are a plan view and a side elevational view of a first embodiment of the heat-sensitive flow rate sensor in accordance with the present invention;

DESCRIPTION OF THE PREFERRED EMBODIMENTS

First Embodiment

Figure 2:
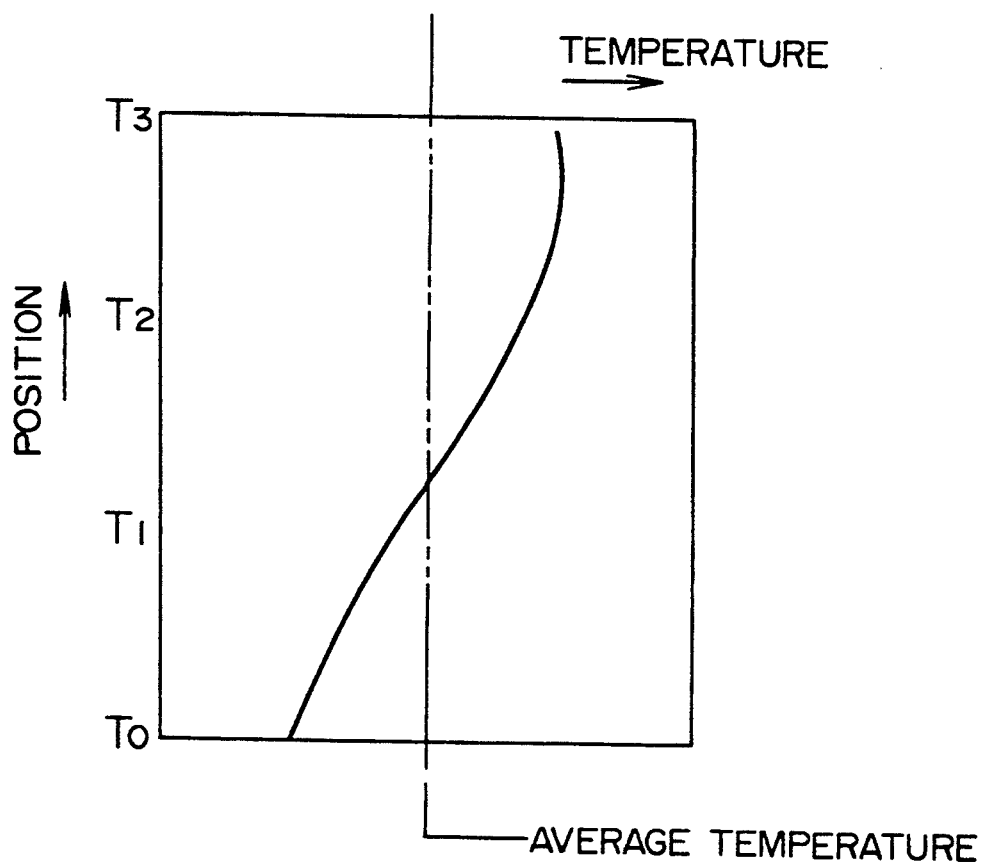
FIG. 2 is an illustration of temperature distribution over a measuring resistor unit incorporated in the first embodiment.
Figure 6A:
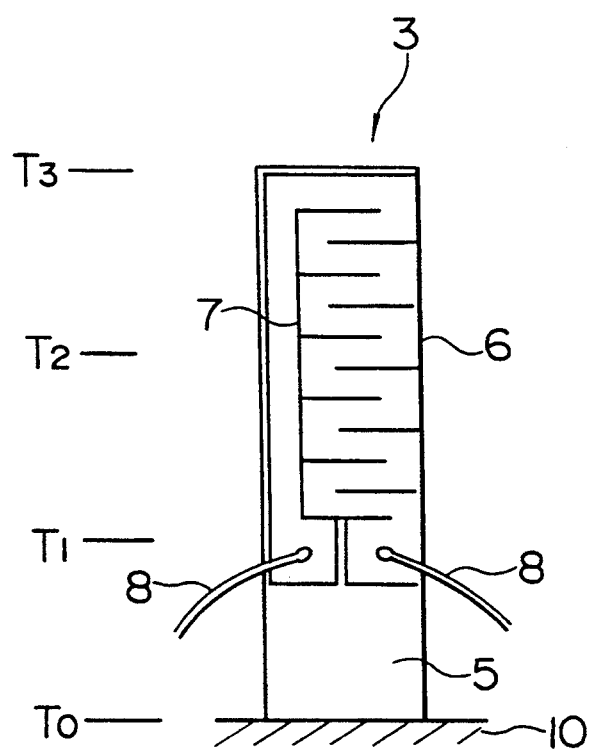
FIGS. 6A and 6B are a front elevational view and a side elevational view of the known heat-sensitive flow rate sensor.
Figure 6B:
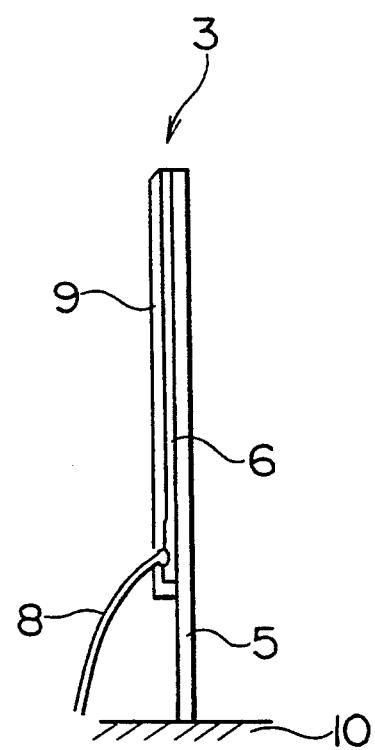
Figure 7:
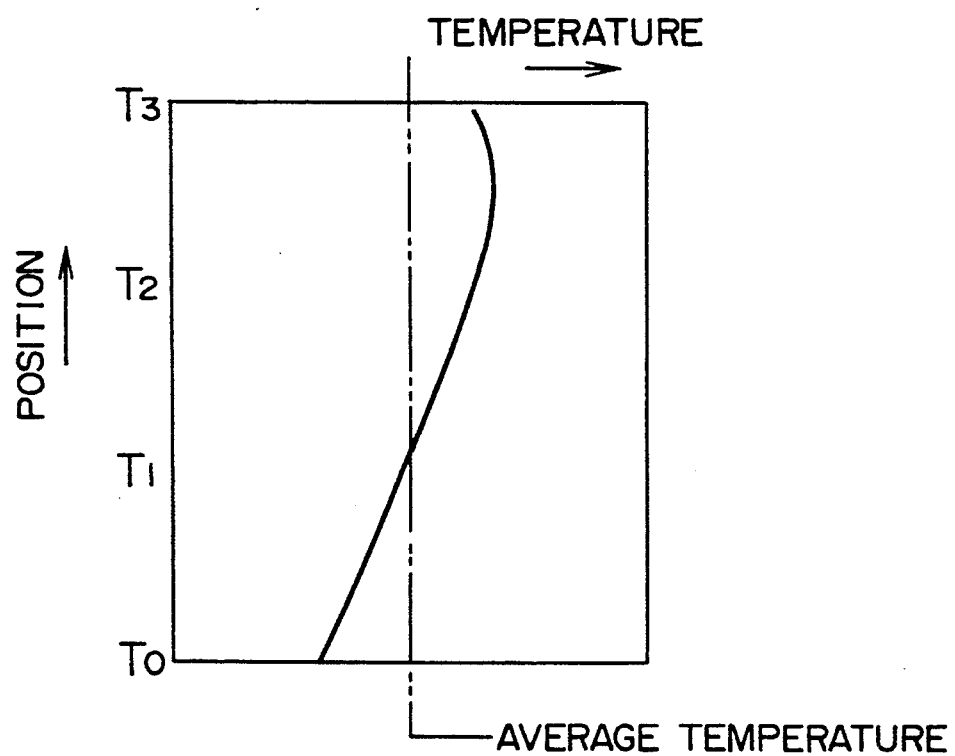
FIG. 7 is a diagram showing temperature distribution over a measuring resistor unit used in the known heat-sensitive flow rate sensor.

A first embodiment of the heat-sensitive flow rate sensor of the present invention will be described with reference to the drawings. The first embodiment has a supporting substrate 5, lead lines 8, a protective coat 9 and a supporting portion 10 which are substantially the same as those of the known heat-sensitive flow rate sensor shown in FIGS. 6A and 6B. In this embodiment, a measuring resistor unit 3A has a heat-sensitive resistor 6A in the form of a thick or thin film the thickness of which progressively increases towards the supporting portion 10 of the measuring resistor unit 3A. Therefore, the resistance value per unit area of the heat-sensitive resistor 6A progressively and continuously decreases towards the supporting portion 10. Consequently, a temperature profile is formed along the measuring resistor unit 3A such that the temperature is progressively lowered towards the supporting portion 10. This serves to reduce the temperature gradients in the heat convection from the heat-sensitive resistor 6A to the supporting substrate 5 and from the supporting substrate to the supporting portion 10. In addition, when a drastic change has been caused in the flow rate of the measured fluid, the time is shortened until the temperature distribution shown in FIG. 2 is reformed into a temperature distribution corresponding to the flow rate after the change, thanks to the reduction in the temperature gradients. Consequently, the start-up time until the required operation temperature is reached in the flow rate sensor is shortened, as well as the time of response of the flow rate sensor to change in the fluid flow rate.

Second Embodiment

Figure 3A:
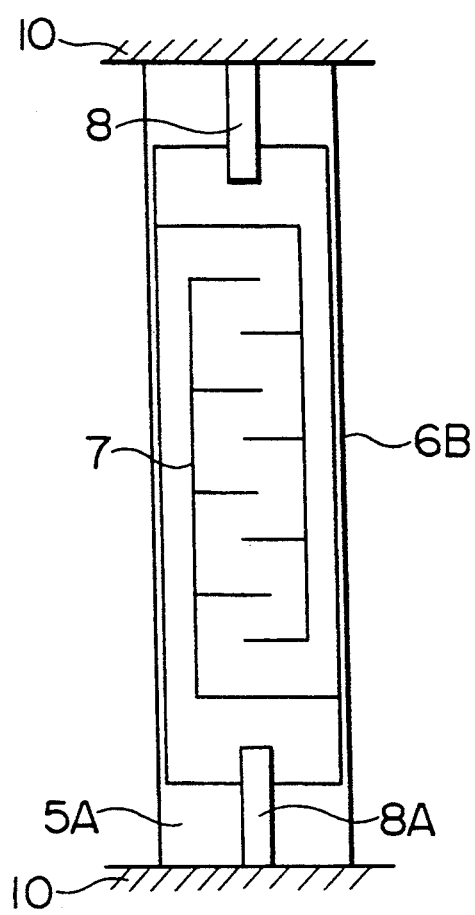
FIGS. 3A and 3B are a plan view and a side elevational view of a second embodiment of the heat-sensitive flow rate sensor in accordance with the present invention.
Figure 3B:
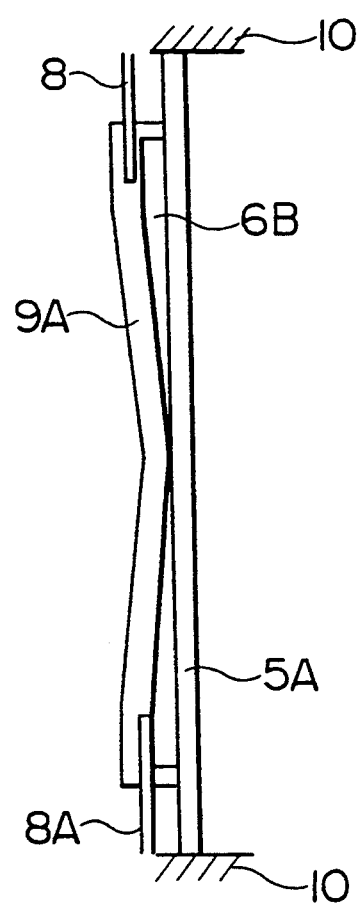
Figure 4A:
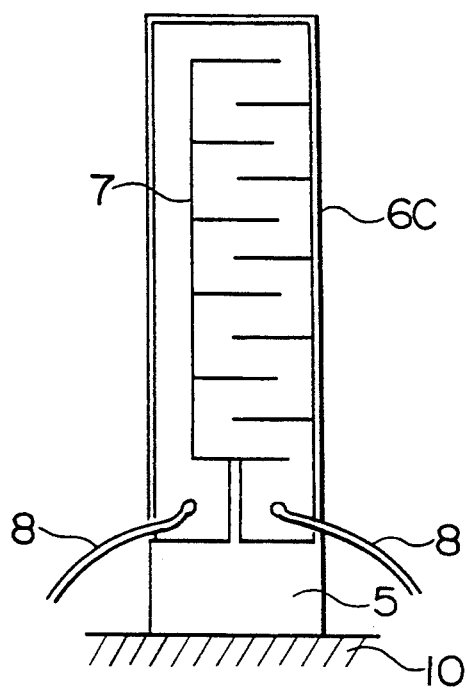
FIGS. 4A and 4B are a plan view and a side elevational view of a second embodiment of the heat-sensitive flow rate sensor in accordance with the present invention.
Figure 4B:
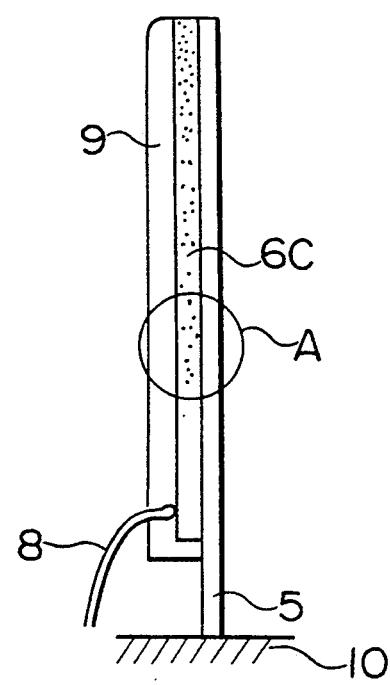
Figure 4C:
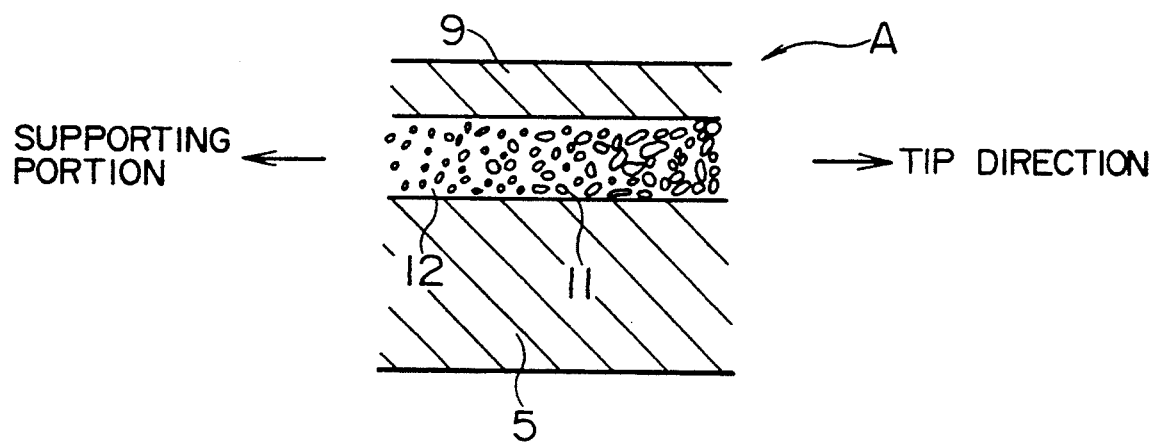
FIG. 4C is an enlarged view of a portion marked by "A" in FIG. 4B.
Figure 5:
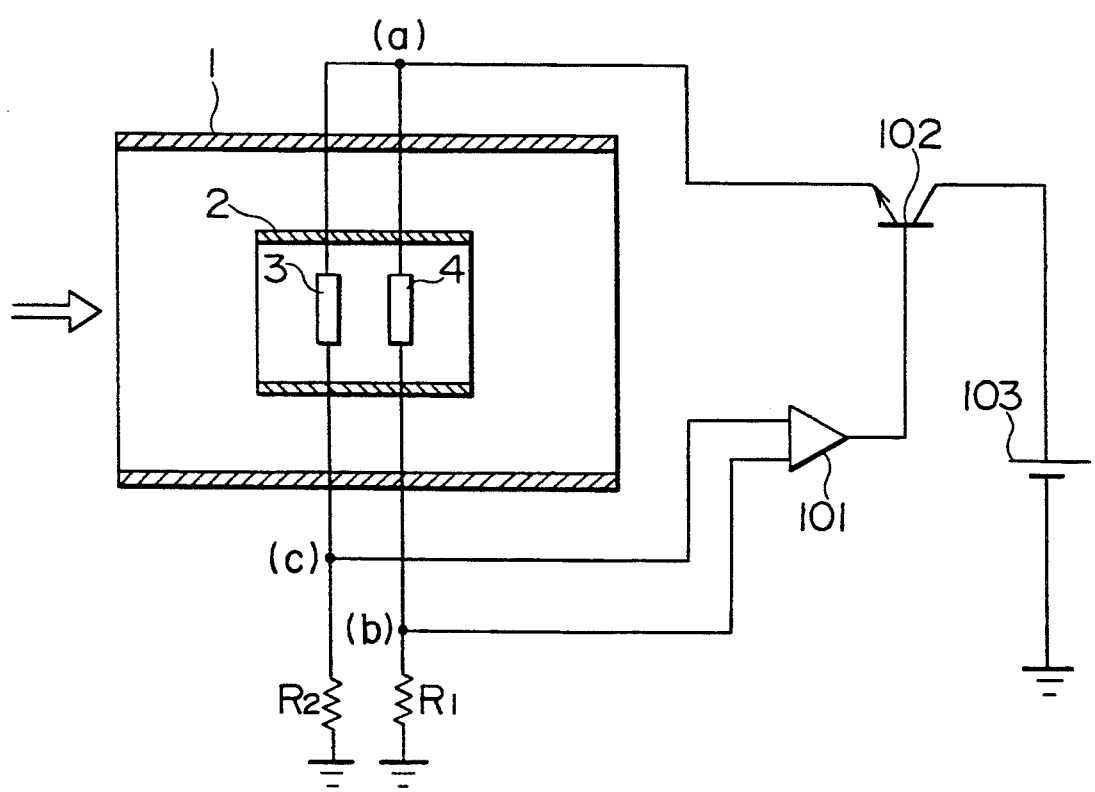
FIG. 5 is a circuit diagram of a known heat-sensitive flow rate sensor.

In the first embodiment, a cantilevered tabular member is used as the supporting substrate 5. This, however, is only illustrative and the substrate 5 may be of the type which is supported at both longitudinal ends of the measuring resistor unit 3, as in a second embodiment which is shown in FIGS. 3A and 3B. In the second embodiment, the resistance value per unit area of the heat-sensitive resistor, denoted by 6B, is determined such that it is greatest at the middle portion thereof and progressively decreases towards each supporting portion 10 of the measuring resistor unit. The heat-sensitive resistor 6B thus formed is covered by a protective coat 9A.

Third Embodiment

In a third embodiment of the heat-sensitive flow rate sensor of the invention, the heat-sensitive resistor, denoted by 6C, is constituted by a film having a constant thickness formed from a composite material composed of a conductors 11 such as metal grains and insulators 12 such as glass particles. The composition of the resistor material, i.e., the compound ratio of the conductors 11 and insulators 12, is so determined that the resistance value of the resistor per unit area progressively decreases towards the supporting portion 10 of the measuring resistor unit.

As will be understood from the foregoing description, according to the present invention, the start-up time until the required operation temperature is reached in the flow tale sensor is shortened, as well as the time of response of the flow rate sensor to change in the fluid flow rate, thus attaining high measuring accuracy of the heat-sensitive flow rate sensor.

What is claimed is:

1. A heat-sensitive flow rate sensor, comprising:
   a housing which provides a principal path of flow of a fluid;
   a detecting tube disposed at a predetermined location inside said housing;
   a measuring resistor unit mounted within said detecting tube by a first support means;
   a fluid temperature sensor mounted within said detecting tube by a first support means;
   resistors connected to said measuring resistor unit and said fluid temperature sensor so as to form a bridge circuit; and
   means for reducing an amount of heat loss by conduction from said measuring resistor unit to said detecting tube through said first support means, said reducing means comprising said measuring resistor unit including a supporting substrate mounted on said first support means, a heat-sensitive resistor formed on said supporting substrate and having a current flow path defined by a trimming line pattern formed in said heat-sensitive resistor, the resistance value of said heat-sensitive resistor progressively and continuously decreasing in a direction towards said first support means.

2. A heat-sensitive flow rate sensor according to claim 1 wherein said measuring resistor unit is supported only at one of its longitudinal ends in said detecting tube by said first support means, said heat-sensitive resistor having a thickness which progressively and continuously increases towards said first support means.

3. A heat-sensitive flow rate sensor according to claim 1 wherein said measuring resistor unit is supported only at one of its longitudinal ends in said detecting tube by said first support means, said heat-sensitive resistor being made of a composite material composed of a conductive component and an insulating component, and the composition ratio between said components being so determined that the resistance value of said heat-sensitive resistor progressively and continuously decreases towards said first support means.

4. A heat-sensitive flow rate sensor according to claim 1 wherein said measuring resistor unit is supported at both of its longitudinal ends in said detecting tube by said first support means, said heat-sensitive resistor having a thickness which progressively and continuously increases in both longitudinal directions away from a substantially mid portion of said measuring resistor unit.

* * * * *